J. L. JUDGE.
VALVE.
APPLICATION FILED JULY 1, 1907.

935,112.

Patented Sept. 28, 1909.

WITNESSES

INVENTOR
JAMES L. JUDGE
BY Paul & Paul
HIS ATTORNEYS

UNITED STATES PATENT OFFICE.

JAMES L. JUDGE, OF MINNEAPOLIS, MINNESOTA.

VALVE.

935,112.

Specification of Letters Patent. Patented Sept. 28, 1909.

Application filed July 1, 1907. Serial No. 381,613.

*To all whom it may concern:*

Be it known that I, JAMES L. JUDGE, of Minneapolis, Hennepin county, Minnesota, have invented certain new and useful Improvements in Valves, of which the following is a specification.

The object of my invention is to provide a valve which will not require any packing around the stem where a packing or stuffing box is usually located.

A further object is to provide improved connecting means between the valve stem and the disk.

The invention consists generally in various constructions and combinations, all as hereinafter described and particularly pointed out in the claims.

Figure 1:
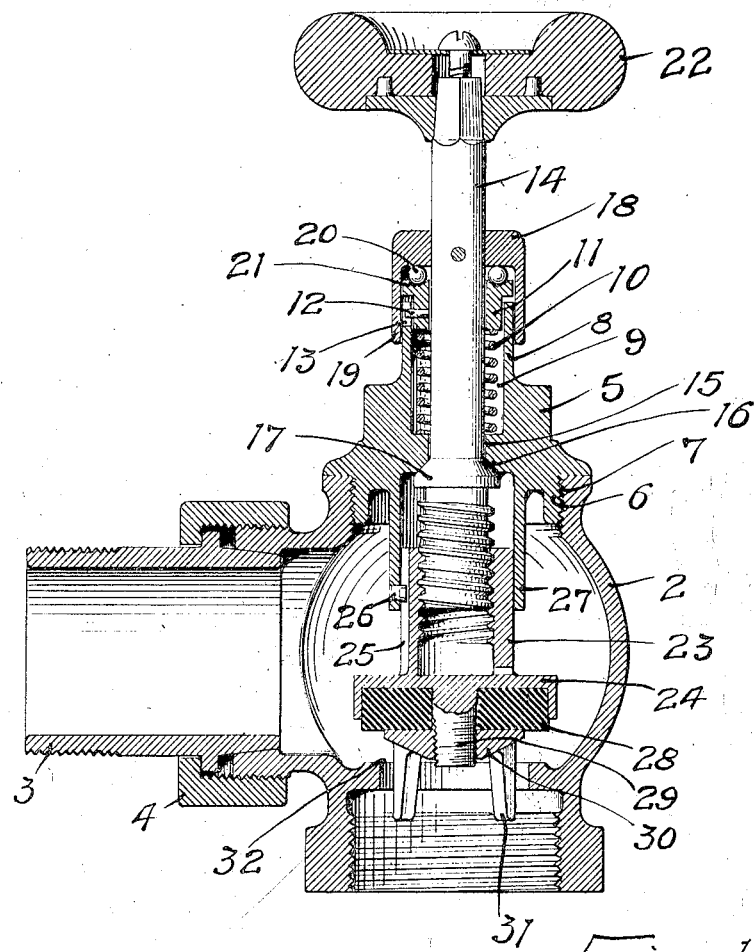
Figure 2:
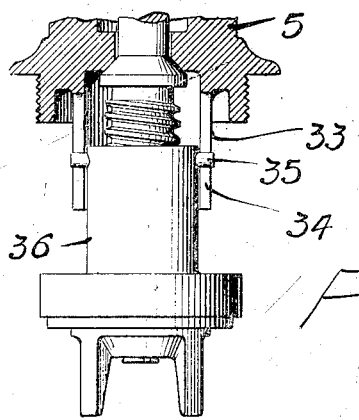

In the accompanying drawings, forming part of this specification, Figure 1 is a vertical sectional view of a valve embodying my invention. Fig. 2 is a detail sectional view illustrating a modified means for connecting the valve disk to the valve head.

In the drawing, 2 represents the valve shell or casing and 3 a pipe connected with the said casing by the usual union 4.

5 is a head having an exteriorly threaded flange 6 within an interiorly threaded opening 7 in the top of the valve casing. The head 5 terminates in a neck 8 having a socket 9 in which a spiral spring 10 is arranged. A plug 11 is fitted into the open end of the socket 9 and is provided with a pin 12 to enter a slot 13 in the upper edge of said neck, said plug being allowed a vertical movement in said socket but prevented from revolving therein by said pin and slot. A valve stem 14 extends through an opening in the said plug and down through the socket and through an opening 15 in the bottom thereof. A beveled seat 16 is provided on the under side of the opening 15, and a collar 17 secured on the valve stem has a corresponding surface to bear on the seat 16 and form a close, steam tight joint therewith. A cap 18 is secured to the valve stem and has flanged edges 19 which extend down beside and inclose the plug 11, and a series of bearing balls 20 are interposed between said cap and the plug 11, and are adapted to roll freely in an annular groove 21 provided in the top of said plug. The ordinary operating wheel 22 is provided on the upper end of the valve stem. The lower end of the valve stem is threaded and fitted into an interiorly threaded stud 23 mounted on a disk 24. A guide way 25 is provided on the said stud and adapted to receive a pin 26 mounted in a depending sleeve 27 on the head 5. The stud 23 fits within said sleeve and is adapted to slide therein but is locked against rotary movement by the guideway and pin. When the valve stem is revolved the stud 23 will move upwardly thereon and with it the disk, and a ring 28 preferably of hard rubber that is carried by said disk and is held in place thereon by means of a threaded stud 29 and a lock nut 30 having depending guides 31 which extend down through the opening in the valve seat 32.

The tension of the spring 10 will hold the beveled surface of the collar 17 against its seat but the stem can be rotated freely to raise or lower the valve. The valve stem will turn easily on the ball bearings and its rotation will raise or lower the sleeve 23 and the valve disk carried thereby to open or close the valve. No packing whatever is required and the valve will always be tight around the stem and will require no attention. The contact of the collar 17 with its seat will keep it clean and smooth and prevent the collection of sediment on the seat which might prevent the beveled collar from coming squarely on its seat.

In Fig. 2 I have shown a modification in which a sleeve 33 is formed on the head 5 and provided with slots 34 to receive pins 35 on the hollow stud 36. The stem of the valve is fitted within this stud in the same manner as shown in Fig. 1. The valve disk in this construction may oscillate forward or back or toward either side and accommodate itself to any inequalities of the valve seat or to any gravel or sediment that may have lodged thereon.

I claim as my invention:

1. A valve comprising a casing having a seat and a head fitting within said casing above said seat, said head having a socket therein and a spring fitting within said socket, the bottom of said socket having an opening therethrough and provided on the under side with a beveled seat, a stem fitting within said socket and extending through the opening in the bottom thereof and having a collar provided with a beveled surface to bear on said seat, a plug fitting within the end of said socket and having a vertical movement therein but locked against rotary movement, a cap carried by said stem and inclosing said plug and having a ball bearing thereon, said spring normally holding said collar against said beveled seat and forming a steam-tight joint therewith, said stem having a threaded lower end, a disk having a threaded stud to receive said stem, means for locking said stud and disk against rotary movement and said disk and stud moving vertically when said stem is revolved to open or close the valve, substantially as described.

2. A valve comprising a casing having a head mounted therein, said head having a socket and a coiled spring therein, and a plug fitting within said socket and having a pin to enter a slot in the wall thereof, whereby rotation of said plug is prevented, a cap inclosing said plug, a ball bearing interposed between said cap and plug, a stem passing through said cap and plug and secured to the former, said stem having a beveled surface adapted to bear on a seat provided on said head below said socket, and said beveled surface being held on its seat with a yielding tension by said spring, and a valve disk attached to the lower end of said stem.

In witness whereof, I have hereunto set my hand this 25th day of June 1907.

JAMES L. JUDGE.

Witnesses:
J. B. EVA,
J. H. BALDWIN.